(12) United States Patent
Tanaka et al.

(10) Patent No.: US 11,198,194 B2
(45) Date of Patent: Dec. 14, 2021

(54) LASER WELDING APPARATUS WITH A CLAMP

(71) Applicant: DENSO CORPORATION, Aichi-pref (JP)

(72) Inventors: Sayaka Tanaka, Toyota (JP); Atsushi Fukunishi, Toyota (JP)

(73) Assignee: DENSO CORPORATION, Kariya (JP)

(*) Notice: Subject to any disclaimer, the term of this patent is extended or adjusted under 35 U.S.C. 154(b) by 410 days.

(21) Appl. No.: 16/215,823

(22) Filed: Dec. 11, 2018

(65) Prior Publication Data

US 2019/0184493 A1 Jun. 20, 2019

(30) Foreign Application Priority Data

Dec. 18, 2017 (JP) .............................. JP2017-242142

(51) Int. Cl.
*B23K 26/22* (2006.01)
*B23K 26/064* (2014.01)
(Continued)

(52) U.S. Cl.
CPC .......... *B23K 26/22* (2013.01); *B23K 26/0006* (2013.01); *B23K 26/02* (2013.01); *B23K 26/082* (2015.10); *B23K 26/0876* (2013.01); *B23K 26/10* (2013.01); *B23K 26/244* (2015.10); *B23K 26/32* (2013.01); *B23K 26/702* (2015.10); *B23K 37/0435* (2013.01); *H01R 43/0221* (2013.01); *H01R 43/0263* (2013.01); *B23K 2101/38* (2018.08); *B23K 2103/12* (2018.08)

(58) Field of Classification Search
CPC .. B23K 2101/38; B23K 26/22; B23K 26/244; B23K 26/0006; B23K 26/10; B23K 26/0876; H01R 43/0221; H01R 43/0263
See application file for complete search history.

(56) References Cited

U.S. PATENT DOCUMENTS 4,461,946 A * 7/1984 Kratschmer ....... B23K 37/0435
219/121.63
4,847,467 A * 7/1989 Ausilio .............. B23K 37/0435
219/121.63
(Continued)

FOREIGN PATENT DOCUMENTS

JP 2016-225083 A 12/2016
JP 2017-073920 A 4/2017

*Primary Examiner* — Geoffrey S Evans
(74) *Attorney, Agent, or Firm* — Sughrue Mion, PLLC (57) ABSTRACT

A welding apparatus that welds a third conductor to a first conductor includes a clamp and a laser irradiation apparatus, the third conductor being adjacent to the first conductor between the first conductor and a second conductor extending in parallel to each other. The clamp is configured to sandwich the first conductor and the third conductor between a first gripper and a second gripper. The laser irradiation apparatus is configured to emit a welding laser towards the third conductor. The first gripper includes a confronting portion facing a contact surface that comes into contact with the first conductor. In a state where the clamp sandwiches the first conductor and the third conductor, the confronting portion and the second gripper are positioned so as to block a reflection laser of the welding laser reflected in a given range of the third conductor.

6 Claims, 7 Drawing Sheets

(51) Int. Cl.
*B23K 26/08* (2014.01)
*B23K 26/00* (2014.01)
*B23K 26/02* (2014.01)
*H01R 43/02* (2006.01)
*B23K 26/10* (2006.01)
*B23K 26/70* (2014.01)
*B23K 26/244* (2014.01)
*B23K 37/04* (2006.01)
*B23K 26/082* (2014.01)
*B23K 26/32* (2014.01)
*B23K 101/38* (2006.01)
*B23K 103/12* (2006.01)

(56) References Cited

U.S. PATENT DOCUMENTS

| | | | | |
|---|---|---|---|---|
| 5,049,720 A | * | 9/1991 | Fang | B29C 66/8242 |
| | | | | 219/121.63 |
| 5,324,913 A | * | 6/1994 | Oberg | B23K 26/037 |
| | | | | 219/121.63 |
| 2020/0164594 A1 | * | 5/2020 | Brunnecker | B29C 65/1629 |

* cited by examiner

LASER WELDING APPARATUS WITH A CLAMP

INCORPORATION BY REFERENCE

The disclosure of Japanese Patent Application No. 2017-242142 filed on Dec. 18, 2017 including the specification, drawings and abstract is incorporated herein by reference in its entirety.

BACKGROUND OF THE INVENTION

1. Field of the Invention

The invention relates to a welding apparatus. The invention relates particularly to a welding apparatus that is suitable for joining a third conductor to a first conductor, the third conductor being positioned between the first conductor and a second conductor that extend in parallel to each other at a narrow interval.

2. Description of Related Art

Japanese Unexamined Patent Application Publication No. 2017-73920 (JP 2017-73920 A) discloses a laminated unit in which a busbar is connected with each of a plurality of power cards that is laminated. Terminals extend from each of the power cards in the same direction, and the terminals are arrayed in a line. An interval between the terminals is narrow. In the narrow interval, the busbar is joined to each of the terminals.

SUMMARY OF THE INVENTION

There are instances where a laser (a welding laser) is used to weld a terminal and a busbar to each other. When an interval between neighboring terminals is narrow, and a busbar is welded to one of the terminals in the interval, the welding laser must irradiate the busbar or the terminal in a diagonal direction relative to an array direction of the terminal and the busbar. In such a case, a reflection laser reflected by the busbar or the terminal could irradiate a device connected with the terminal. This applies not only to the terminal and the busbar, but also to a case where a third conductor is welded to a first conductor, the third conductor being positioned between the first conductor and a second conductor extending in parallel to each other. The specification provides a welding apparatus that is suitable for joining a third conductor to a first conductor, the third conductor being positioned between the first conductor and a second conductor extending in parallel to each other at a narrow interval.

A welding apparatus disclosed in the specification includes a clamp and a laser irradiation apparatus. The clamp includes a first gripper and a second gripper, and at least one of them is able to move. The clamp is able to sandwich the first conductor and the third conductor between the grippers. The laser irradiation apparatus is configured to emit a welding laser towards the third conductor in a diagonal direction with respect to an array direction of the first, second, and third conductors. The laser irradiation apparatus is able to change a point of irradiation of the welding laser such that the point of irradiation moves within a given range of the third conductor. The first gripper includes a contact surface and a confronting portion that faces the contact surface, the contact surface coming into contact with the first conductor. The confronting portion is provided in the first gripper such that the confronting portion is positioned between the second conductor and the third conductor in a state where the clamp sandwiches the first conductor and the third conductor. Then, in a state where the clamp sandwiches the first conductor and the third conductor, the confronting portion and the second gripper are positioned so as to block an optical path of a reflection laser of the welding laser reflected within the given range of the third conductor. In other words, the two members of the welding apparatus disclosed in the specification block the reflection laser of the welding laser, the two members being the second gripper and the confronting portion.

The first gripper and the second gripper of the clamp move relative to each other. When the first gripper and the second gripper are far apart from each other, the second gripper moves closer to the confronting portion. Therefore, both the second gripper and the confronting portion are inserted between the second conductor and the third conductor easily. When the first gripper and the second gripper sandwich the first conductor and the third conductor, the second gripper comes into contact with the third conductor. Meanwhile, a point of irradiation of the welding laser that irradiates the third conductor moves within a welding range. An optical path of the reflection laser also changes. In the welding apparatus, the second gripper blocks the optical path of the reflection laser on a side closer to the second conductor, and the confronting portion blocks the optical path of the reflection laser on a side far from the second conductor. The welding apparatus is able to block the reflection laser of the welding laser when the third conductor is welded between the first conductor and the second conductor that extend in parallel to each other at a narrow interval, thereby preventing the reflection laser of the welding laser from irradiating devices connected with the first conductor and so on. Moreover, the relatively-moving first gripper of the clamp is provided with the confronting portion that blocks the reflection laser. Therefore, the second gripper and the confronting portion are easily inserted in the narrow interval between the first conductor and the second conductor.

When the second conductor extending in parallel to the first conductor is closer to the first conductor than a planned position, the welding laser emitted diagonally can be blocked by the second conductor. Therefore, in the welding apparatus disclosed in the specification, a distance between a first surface of the confronting portion and the contact surface of the first gripper may be equal to a distance between the first conductor and the second conductor. The first surface of the confronting portion here is on an opposite side of the confronting portion from a side that faces the contact surface of the first gripper. In the clamp having the above configuration, when the first gripper and the second gripper sandwich the first conductor and the third conductor, the confronting portion comes into contact with the second conductor. When the second conductor is closer to the first conductor more than the planned position, the confronting portion of the first gripper moves the second conductor away from the first conductor. Therefore, the welding laser emitted in the diagonal direction is prevented from being blocked by the second conductor. The "distance between the surface of the confronting portion and the contact surface of the first gripper, the surface of the confronting portion being on the opposite side of the confronting portion from the side that faces the contact surface of the first gripper" only needs to be almost equal to the distance between the first conductor and the second conductor.

A part of a second surface of the confronting portion on a side closer to the contact surface of the first gripper, the second surface of the confronting portion facing an optical path of the welding laser, may be parallel to the optical path of the welding laser. With such a shape, it is possible to arrange the confronting portion close to the optical path of the welding laser.

The given range may be a welding range in which the third conductor is welded to the first conductor. The details of the techniques disclosed in the specification and further improvements are described in "Detailed Description of Embodiments" below.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
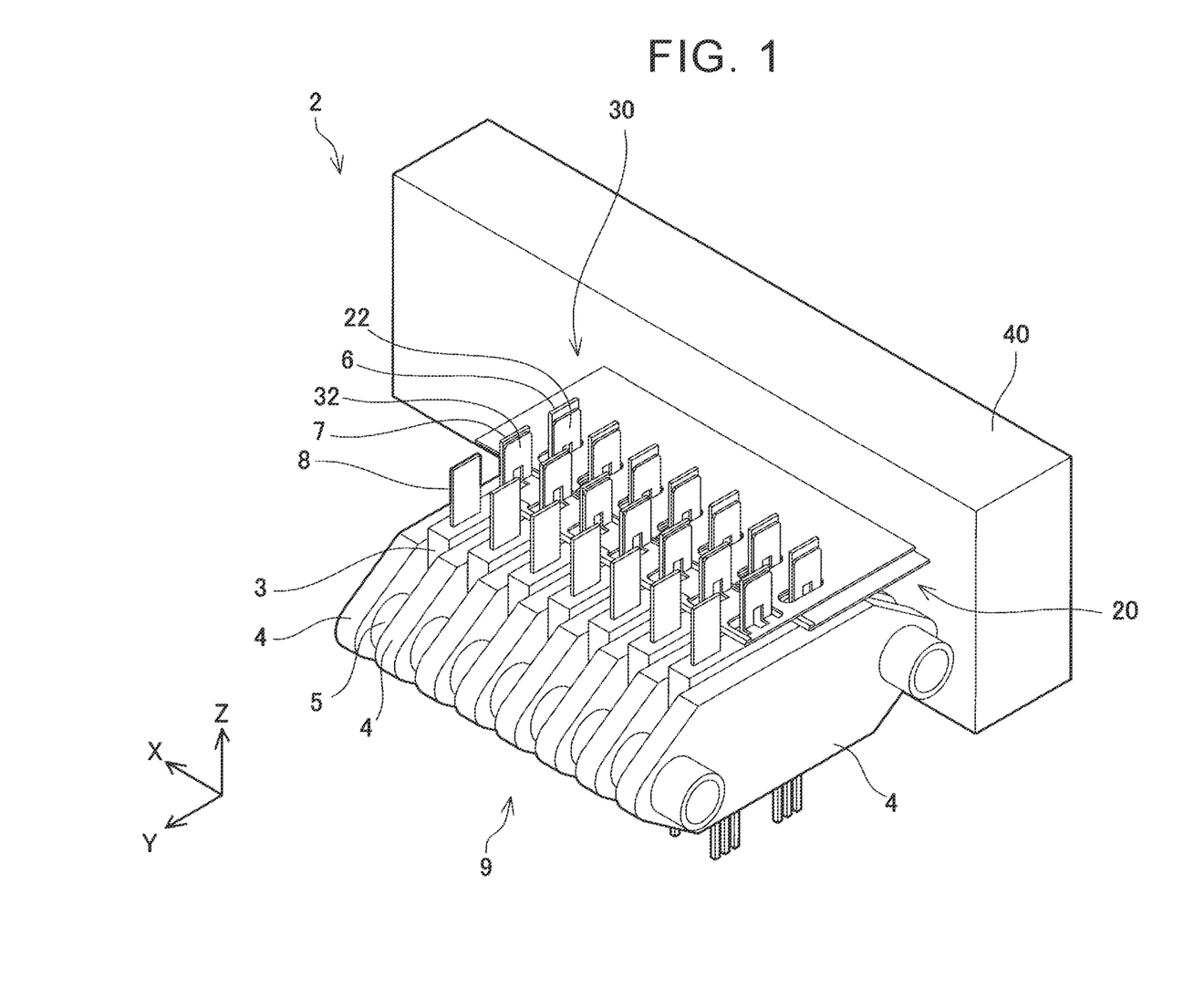
FIG. 1 is a perspective view of a power converter that includes a device (a laminated unit) having conductors welded by a welding apparatus according to an example.
Figure 2:
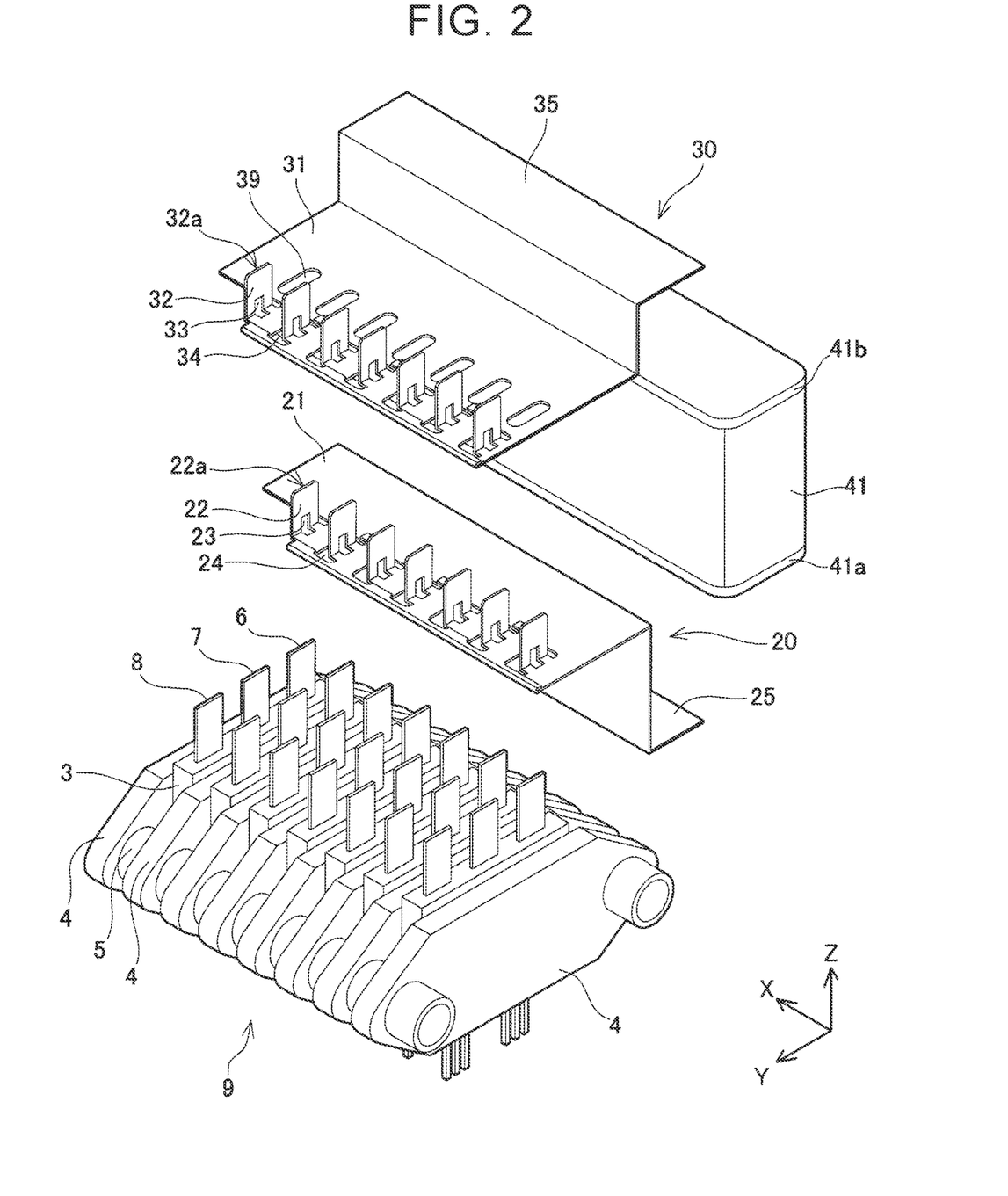
FIG. 2 is an exploded view of the power converter that includes the laminated unit.

Before describing a welding apparatus according to an example, description is given about one example of an object to be welded. The object to be welded is terminals in a laminated unit in which each of a plurality of power cards and each of a plurality of coolers are laminated alternately. FIG. 1 is a perspective view of a power converter 2 including a laminated unit 9, and FIG. 2 is an exploded perspective view of the power converter 2.

The power converter 2 includes the laminated unit 9, a capacitor module 40, a positive busbar 20, and a negative busbar 30. In the laminated unit 9, each of a plurality of power cards 3 and each of a plurality of coolers 4 are laminated alternately. The positive busbar 20 and the negative busbar 30 electrically connect the laminated unit 9 and the capacitor module 40. The power converter 2 is a device that includes a voltage converter and an inverter. Both the voltage converter and the inverter use a plurality of power transistors. The power transistors generate a large amount of heat. In order to intensively cool the power transistors, in the power converter 2, the power transistors of the voltage converter and the inverter are consolidated in the laminated unit 9. Further, the power converter 2 includes a large capacitor in order to smooth a large current. A large capacitor element is housed in the capacitor module 40. In order to connect the power transistors inside the power cards 3 and the capacitor element, the busbars 20, 30 with low internal resistance are used.

In each of the power cards 3, two power transistors connected in series are incorporated. A terminal (a positive electrode terminal 6) on a high potential side in the series connection of the two power transistors, a terminal (a negative electrode terminal 7) on a low potential side, and a mid-point terminal (a mid-point terminal 8) extend from an upper surface of the power card 3. The coolers 4 are laminated so as to sandwich each of the power cards 3. In FIG. 1 and FIG. 2, the reference numeral 3 is given only to the leftmost power card in the drawings, and the reference numeral is omitted for the remaining power cards. Also, in FIG. 1 and FIG. 2, reference numeral 4 is given only to the two leftmost coolers and the rightmost cooler, and the reference numeral is omitted for the remaining coolers. The coolers 4 next to each other through the power card 3 are connected by two connection pipes 5. The capacitor module 40 is a module in which the capacitor element 41 is sealed with resin.

The positive busbar 20 is made out of a single metal plate (typically copper). The positive busbar 20 includes a broad plate-shaped body portion 21, an electrode portion 25, and a plurality of branch portions 22. The electrode portion 25 extends from an edge of the body portion 21 and is connected with a positive electrode 41a of the capacitor element 41. Each of the branch portions 22 extends almost vertically from the body portion 21. The body portion 21 is provided with a plurality of holes 24 arrayed in line, and all of the branch portions 22 except the leftmost branch portion 22 in the drawings extend from edges of the holes 24, respectively. When the positive busbar 20 is assembled to the laminated unit 9, the positive electrode terminals 6 of the power cards 3 go through the holes 24, respectively. The positive electrode terminals 6 have a flat plate shape, and the branch portions 22 of the positive busbar 20 also have a flat plate shape. A surface of the positive electrode terminal 6 in a negative direction of an X axis, and a surface of the branch portion 22 in a positive direction in the X axis are joined to each other by a welding laser. The surface of the branch portion 22 in the positive direction in the X axis corresponds to a joining surface 22a that is joined to the positive electrode terminal 6.

The negative busbar 30 is also made out of a single metal plate (typically copper). The negative busbar 30 includes a broad plate-shaped body portion 31, an electrode portion 35, and a plurality of branch portions 32. The electrode portion 35 extends from an edge of the body portion 31 and is connected with a negative electrode 41b of the capacitor element 41. Each of the branch portions 32 extends almost vertically from the body portion 31. The body portion 31 is provided with a plurality of holes 34 arrayed in line, and all of the branch portions 32 except the leftmost branch portion 32 in the drawings extend from edges of the holes 34, respectively. Also, another plurality of holes 39 is arrayed in line next to the line of the holes 34 arrayed in line. When the negative busbar 30 is assembled to the laminated unit 9, the negative electrode terminals 7 of the power cards 3 go through the holes 34, respectively, and the positive electrode terminals 6 go through the holes 39, respectively. The positive electrode terminals 6 do not come into contact with edges of the holes 34, and the positive electrode terminals 6 and the negative busbar 30 thus remain insulated from one another.

The negative electrode terminals 7 have a flat plate shape, and the branch portions 32 of the negative busbar 30 also have a flat plate shape. A surface of the negative electrode terminal 7 in the negative direction of the X axis, and a surface of the branch portion 32 in the positive direction of the X axis are joined to each other by a welding laser. The surface of the branch portion 32 in the positive direction of the X axis corresponds to a joining surface 32a that is joined to the negative electrode terminal 7. Another busbar (not shown) is joined to the midpoint terminals 8.

As shown in FIG. 1, the positive electrode terminals 6 of the power cards 3 are flat metal plates and arrayed in line in the X direction so that broad surfaces of the flat plates face each other. An interval between the neighboring positive electrode terminals 6 is narrow. Each of the branch portions 22 of the positive busbar 20 is joined to the positive electrode terminal 6 on one side in the narrow interval. The branch portions 22 are also flat plates, and broad surfaces of the branch portions 22 are joined to the broad surfaces of the positive electrode terminals 6, respectively. Similarly, the negative electrode terminals 7 are arrayed in line in the X direction so that their broad surfaces face each other, and an interval between the neighboring negative electrode terminals 7 is narrow. Each of the branch portions 32 of the negative busbar 30 is joined to the negative electrode terminal 7 on one side in the narrow interval. The branch portions 32 are also flat plates, and a broad surface of each of the branch portions 32 is joined to the broad surface of the negative electrode terminal 7 on one side.

Figure 3:
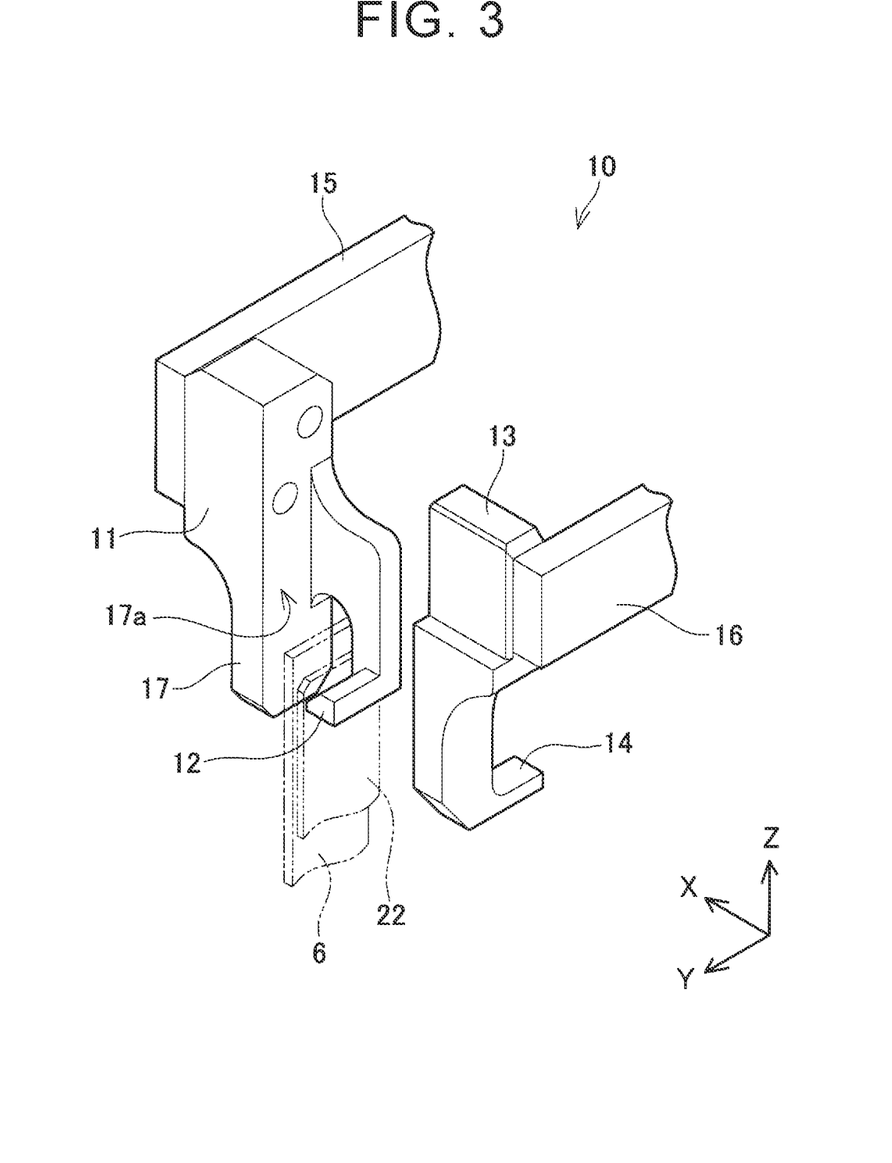
FIG. 3 is a perspective view of a distal end of a clamp (a first gripper and a second gripper)

A welding apparatus 100 according to the example is described. Here, description is given regarding the welding apparatus using an example case where each of the branch portions 22 of the positive busbar 20 is welded to each of the positive electrode terminals 6 of the power cards 3. The welding apparatus 100 includes a clamp 10 and a laser irradiation apparatus 18. First of all, FIG. 3 shows a perspective view of a distal end of the clamp 10. The clamp 10 includes a first gripper 17 and a second gripper 14. The first gripper 17 and the second gripper 14 sandwich the positive electrode terminal 6 and the branch portion 22. In FIG. 3, the positive electrode terminal 6 and the branch portion 22 are shown by imaginary lines.

In the first gripper 17, its base portion (a first gripper base portion 11) is attached to a distal end of a swing support portion 15. In the second gripper 14, its base portion (a second gripper base portion 13) is attached to a distal end of a fixed support portion 16. The swing support portion 15 is moved by an actuator (not shown). The swing support portion 15, in other words, the first gripper 17 is able to move in an array direction of the positive electrode terminal 6 and the branch portion 22 (the X direction in the drawing). The swing support portion 15 enables the first gripper 17 to move in directions approaching and separating from the second gripper 14.

The "first gripper 17" means a part that comes into contact with an object to be sandwiched (the positive electrode terminal 6). Therefore, a portion that is continuous with the first gripper 17 but does not come into contact with the object is referred to as the first gripper base portion 11. Similarly, the "second gripper 14" means a part that comes into contact with an object to be sandwiched (the branch portion 22). Therefore, a portion that is continuous with the second gripper 14 but does not come into contact with the object is referred to as the second gripper base portion 13.

The first gripper 17 includes a flat contact surface 17a that faces the broad surface of the positive electrode terminal 6. Also, the first gripper 17 is provided with a confronting portion 12 through the first gripper base portion 11. The confronting portion 12 is positioned so as to face the contact surface 17a. As described later, the confronting portion 12 is provided in the first gripper 17 so that, when the first gripper 17 and the second gripper 14 of the clamp 10 sandwich the positive electrode terminal (a left terminal 6a) and the branch portion 22, the confronting portion 12 is positioned between the positive electrode terminal on the other side (a right terminal 6b) and the branch portion 22.

Figure 4:
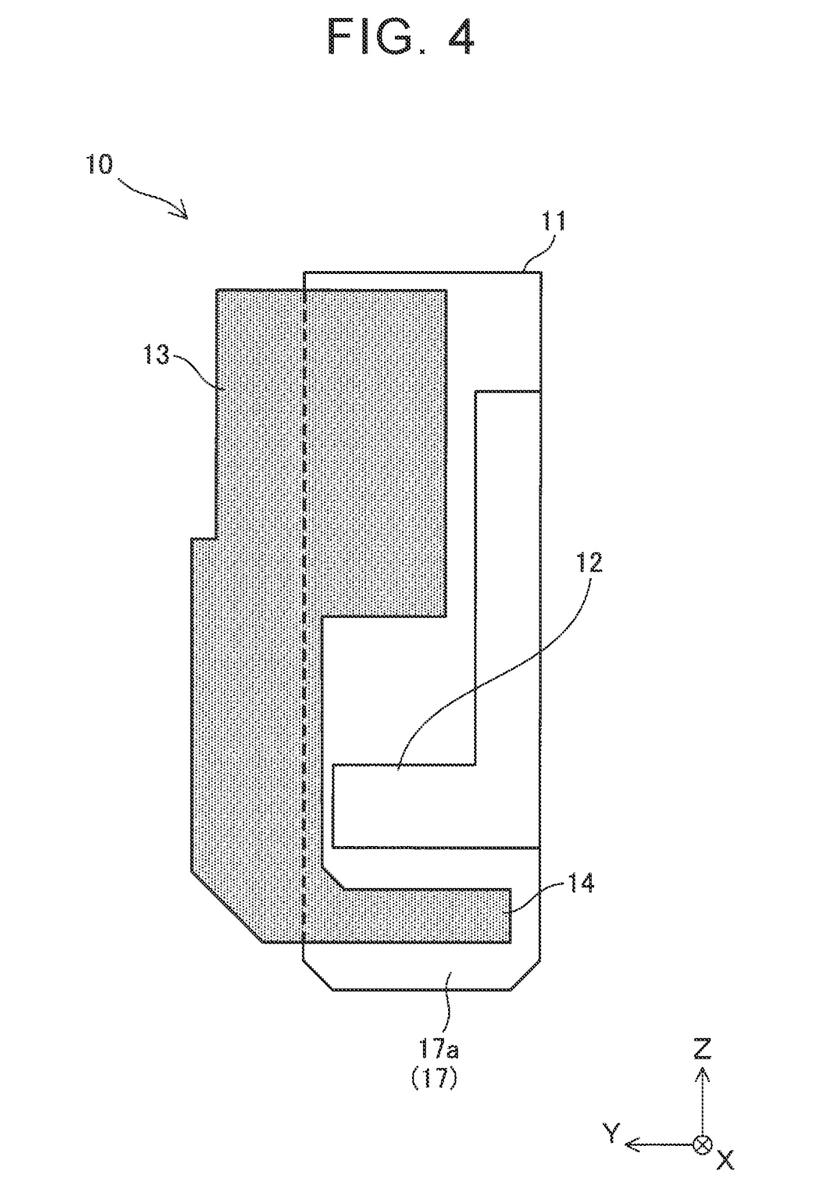
FIG. 4 is a plan view of the distal end of the clamp (the first gripper and the second gripper)

FIG. 4 is a plan view of the distal end of the clamp 10 seen from a second gripper 14 side in an X direction of a coordinate system in the drawing. The X direction of the coordinate system in the drawing corresponds to a swing direction of the first gripper 17. In order to facilitate understanding, the second gripper 14 and the second gripper base portion 13 are filled in a gray color. In a view from the swing direction of the first gripper 17, the second gripper 14 is positioned so as to overlap the contact surface 17a of the first gripper 17, and not to overlap the confronting portion 12. This means that, when the first gripper 17 moves, the confronting portion 12 does not interfere with the second gripper 14, and the confronting portion 12 and the second gripper 14 pass each other.

Figure 5:
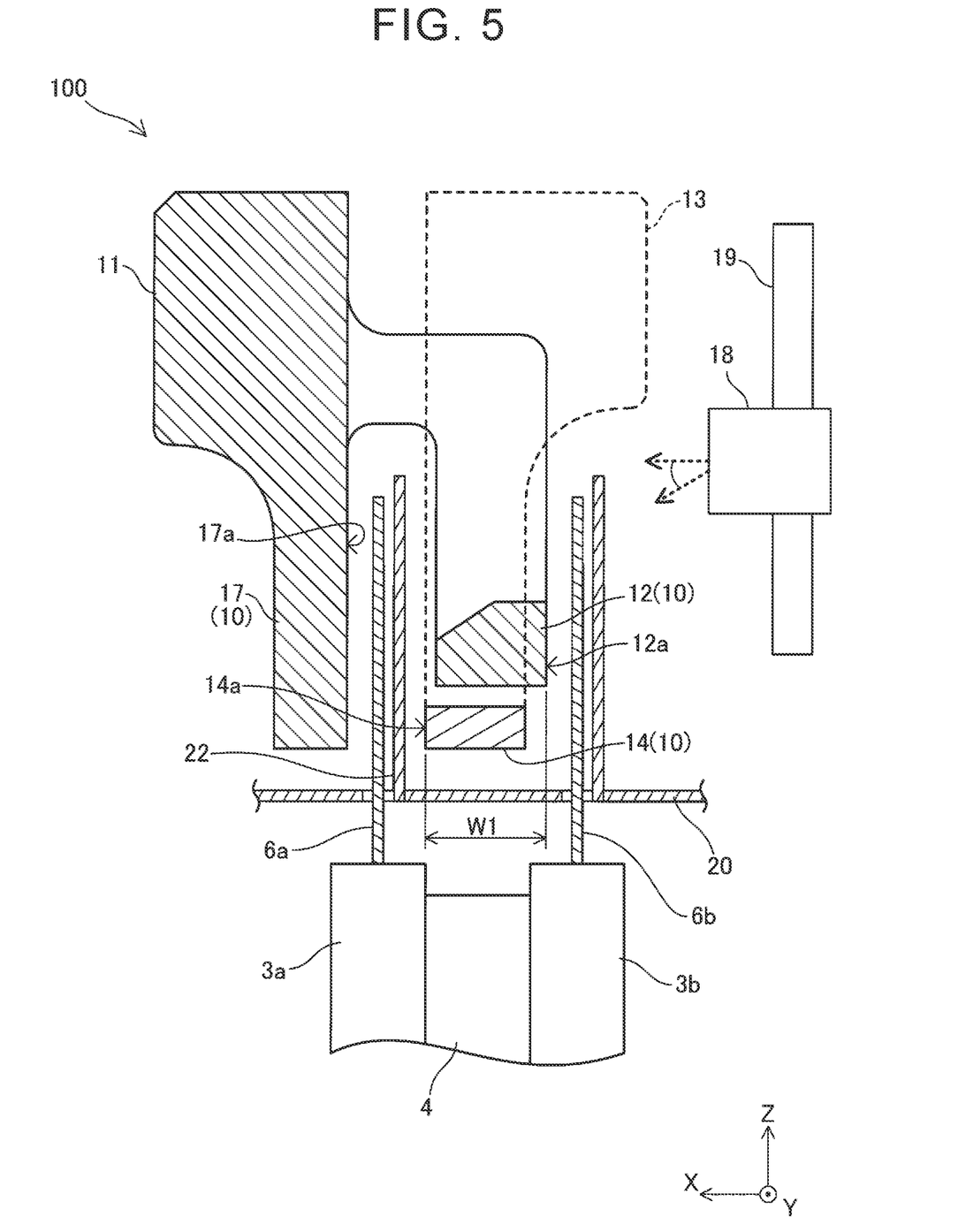
FIG. 5 is a sectional view of the welding apparatus in which the laminated unit is set (before clamping)
Figure 6:
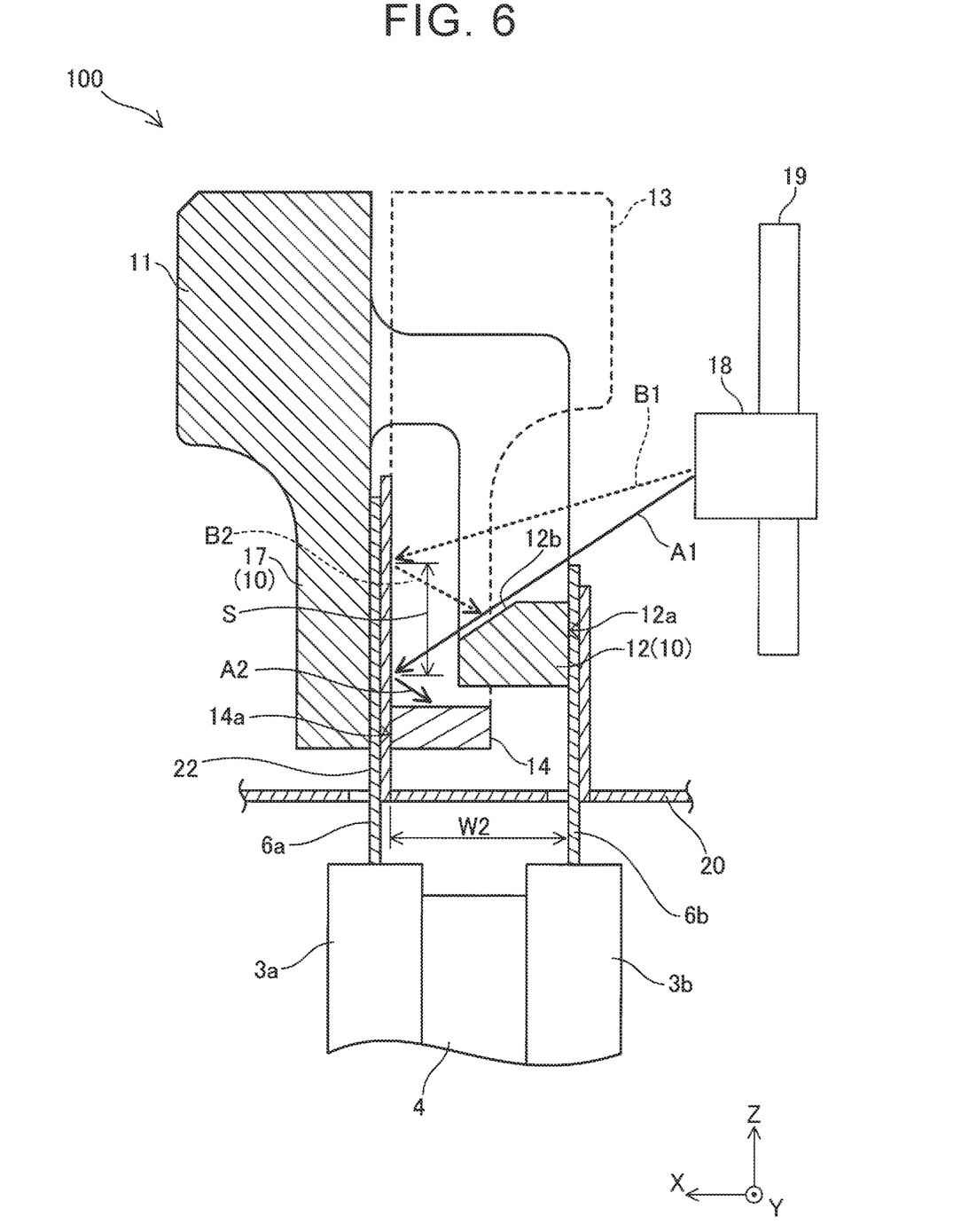
FIG. 6 is a sectional view of the welding apparatus in which the laminated unit is set (after clamping)

FIG. 5 and FIG. 6 are sectional views of the welding apparatus 100 in which the laminated unit 9 is set. FIG. 5 and FIG. 6 are sectional view of the periphery of the clamp 10. In FIG. 5 and FIG. 6, a part of the laminated unit 9 (parts of a pair of the power cards 3a, 3b, and a part of the cooler 4 between the power cards 3a, 3b) is shown. FIG. 5 and FIG. 6 are sectional views taken along a plane that passes the first gripper 17, the second gripper 14, the positive electrode terminals 6, and the branch portions 22 of the positive busbar 20. In each of FIG. 5 and FIG. 6, a pair of the positive electrode terminals 6 is depicted. For convenience of description, the positive electrode terminal on the left in the drawings is referred to as the left terminal 6a, and the positive electrode terminal on the right is referred to as the right terminal 6b. FIG. 5 is a side view before the clamp 10 clamps the left terminal 6a and the branch portion 22 of the positive busbar 20, and FIG. 6 is a side view after the clamp 10 clamps the left terminal 6a and the branch portion 22.

The left terminal 6a and the right terminal 6b extend in parallel to each other, and the branch portion 22 of the positive busbar 20 is positioned between the left terminal 6a and the right terminal 6b. In FIG. 5 and FIG. 6, the branch portion 22 is welded to the left terminal 6a. The confronting portion 12 facing the contact surface 17a of the first gripper 17 is positioned between the branch portion 22 and the right terminal 6b when the clamp 10 clamps the left terminal 6a and the branch portion 22. At that time, most parts of the confronting portion 12 and the second gripper 14 overlap each other in an extending direction of the positive electrode terminals 6 (the Z direction).

For convenience of description, a surface of the confronting portion 12 on the opposite side of the confronting portion 12 from a side that faces the contact surface 17a is referred to as a back surface 12a. Also, a surface of the second gripper 14 that comes into contact with the branch portion 22 is referred to as a contact surface 14a. In the state shown in FIG. 5, most parts of the confronting portion 12 and the second gripper 14 overlap each other in the extending direction of the positive electrode terminal 6 (the Z direction), and a distance between the back surface 12a and the contact surface 14a is W1. When the first gripper 17 and the second gripper 14 sandwich the left terminal 6a and the branch portion 22, a distance between the back surface 12a and the contact surface 14a becomes W2 (FIG. 6). Since the distance W1 between the back surface 12a and the contact surface 14a before the left terminal 6a and the branch portion 22 are sandwiched is short, the confronting portion 12 and the second gripper 14 are easily inserted between the positive electrode terminals 6 (the left terminal 6a and the right terminal 6b).

The welding apparatus 100 includes the laser irradiation apparatus 18 that emits a welding laser. The laser irradiation apparatus 18 is supported by a support 19. The laser irradiation apparatus 18 incorporates a laser oscillator, a beam expander, an X-axis rotating galvanometer mirror, a Y-axis rotating galvanometer mirror, a lens, and so on. The X-axis rotating galvanometer mirror and the Y-axis rotating galvanometer mirror are able to rotate about axes that are orthogonal to each other. The welding laser emitted by the laser oscillator passes the beam expander, and is reflected by the two galvanometer mirrors. Thereafter, the welding laser is focused by the lens, and then emitted from the laser irradiation apparatus 18. By changing angles of the two galvanometer mirrors, it is possible to change a point of irradiation of the welding laser. In the example, description is given assuming that the laser irradiation apparatus is able to move the point of irradiation about the Y axis of the coordinate system in the drawings. Since a laser irradiation apparatus that is able to change a point of irradiation is widely known, detailed description of parts such as galvanometer mirrors is omitted. The laser irradiation apparatus 18 moves the point of irradiation by changing an irradiation direction, and is able to irradiate the entire joining range having a given area with the welding laser.

FIG. 6 shows a state where the first gripper 17 and the second gripper 14 clamp the left terminal 6a and the branch portion 22. A range S (a welding range S) in FIG. 6 shows an irradiation range of the welding laser. In order to irradiate every place of the welding range S with the welding laser, the laser irradiation apparatus 18 changes an irradiation direction of the welding laser (FIG. 6). A thick arrow A1 shows the welding laser irradiating a lower end of the welding range S, and a thick arrow A2 shows its reflection laser. A broken line arrow B1 shows the welding laser irradiating an upper end of the welding range S, and a broken line arrow B2 shows its reflection laser. An optical path of the reflection laser changes within a range between the thick arrow A2 and the broken line arrow B2.

As understood in FIG. 6, the reflection laser A2 at the lower end of the welding range S is blocked by the second gripper 14. The reflection laser B2 at the upper end of the welding range S is blocked by the confronting portion 12. In a view along the optical path of the reflection laser, there is no gap between the second gripper 14 and the confronting portion 12. Therefore, all of the reflection lasers reflected in the welding range S are blocked by either the second gripper 14 or the confronting portion 12. In other words, the confronting portion 12 and the second gripper 14 are positioned so as to block the optical path of the reflection laser reflected within the welding range S of the branch portion 22. Since all of the reflection lasers are blocked, the reflection lasers are prevented from irradiating other devices (for example, the power card 3 or the cooler 4). In particular, the second gripper 14 and the confronting portion 12 that block the reflection laser move in the array direction of the positive electrode terminals (the left terminal 6a and the right terminal 6b). As described earlier, before the second gripper 14 and the confronting portion 12 are inserted between the branch portion 22 and the right terminal 6b, the second gripper 14 and the confronting portion 12 are closer to each other, and thus easy to be inserted. When the clamp 10 sandwiches the left terminal 6a and the branch portion 22, the confronting portion 12 and the second gripper 14 move relative to each other, and are thus able to block all of the reflection lasers. The welding apparatus 100 is suitable for welding a conductor (the branch portion 22) between other two conductors (the left terminal 6a and the right terminal 6b) extending in parallel to each other at a narrow interval.

As shown in FIG. 6, a surface (a distal end upper surface 12b) of the confronting portion 12 facing the optical path of the welding laser (the thick arrow A1), the surface also being a part close to the contact surface 17a, is parallel to the optical path (the thick arrow A1). Thus, it is possible to position the confronting portion 12 close to the optical path of the welding laser without blocking the welding laser.

Figure 7:
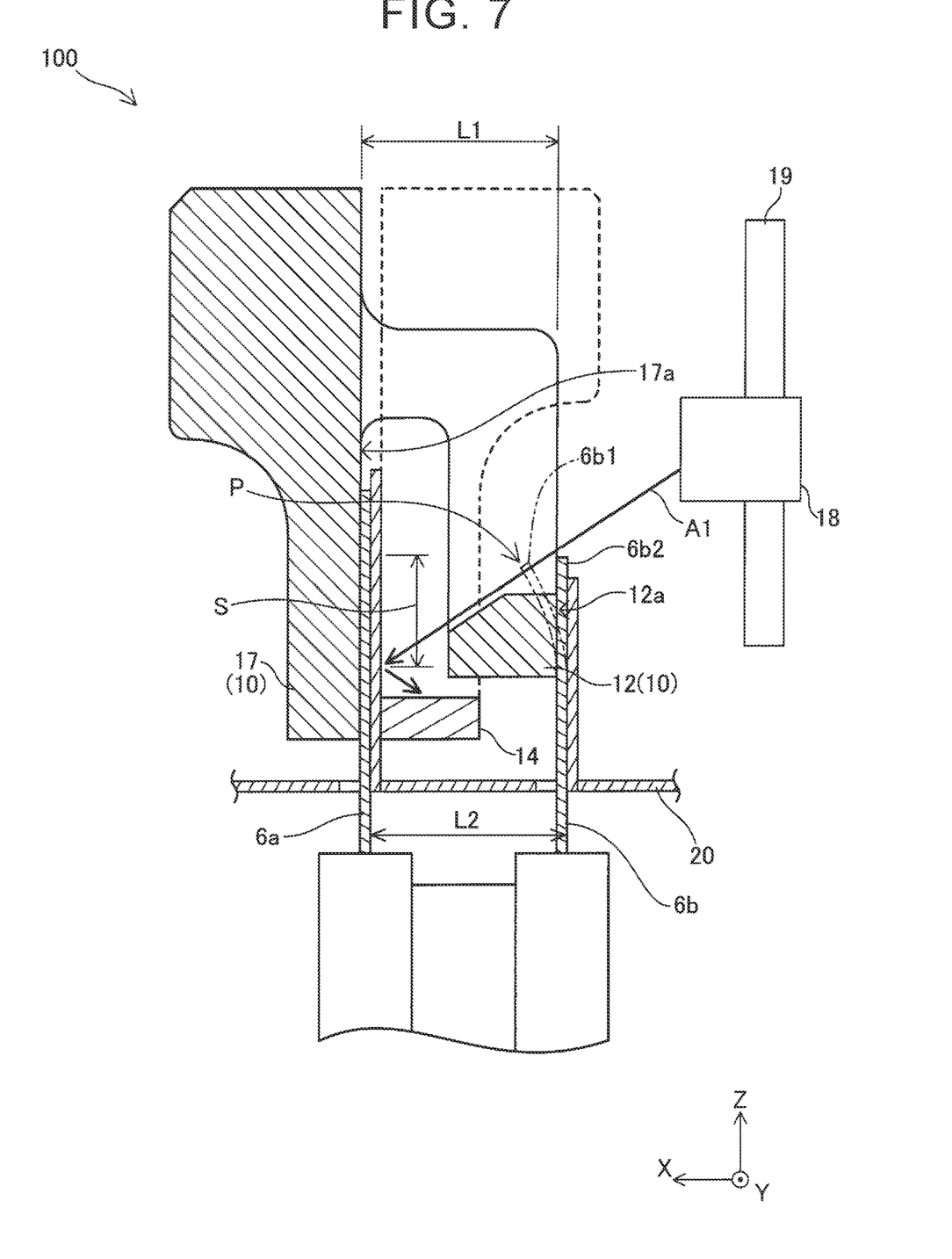
FIG. 7 is a sectional view of the welding apparatus in which the laminated unit is set (when a right terminal 6b is bent).

FIG. 7 is the same as FIG. 6, and shows a case where an initial position of the right terminal 6b (a right terminal 6b1) is closer to the left terminal 6a than a planned position. As shown in FIG. 7, the optical path (the thick arrow A1) of the welding laser at the lower end of the welding range S passes close to the right terminal 6b. When the right terminal 6b is bent and is closer to the left terminal 6a than a planned position (the right terminal 6b1), the right terminal 6b1 might block the optical path (see point P in FIG. 7). A length L1 from the contact surface 17a of the first gripper 17 to the back surface 12a is equal to a distance L2 between the positive electrode terminals (the left terminal 6a and the right terminal 6b). Therefore, when the clamp 10 clamps the left terminal 6a and the branch portion 22, the confronting position 12 comes into contact with the bent right terminal 6b1, thus returning the right terminal to a correct position 6b2. Therefore, it is possible to prevent the right terminal 6b from blocking the optical path. The distance L1 between the contact surface 17a and the back surface 12a only need to be almost equal to the distance L2 between the left terminal 6a and the right terminal 6b.

Notes are given regarding the techniques described in the example. The left terminal 6a corresponds to an example of a first conductor, the right terminal 6b corresponds to an example of a second conductor. The branch portion 22 of the positive busbar 20 corresponds to an example of a third conductor.

The example describes an example case where the branch portion 22 is positioned between the neighboring left terminal 6a and the right terminal 6b, and the branch portion 22 is irradiated with the welding laser. The foregoing description is also true for a case where the left terminal 6a is irradiated with the welding laser. As shown in FIG. 1 and FIG. 2, the branch portions 22 are arrayed in line, and the positive electrode terminal 6 is welded between the neighboring branch portions 22 to one of the branch portions 22. Therefore, when irradiating the branch portion 22 with the welding laser, the neighboring the branch portions 22 correspond to the first conductor and the second conductor, respectively, and the positive electrode terminal 6 positioned between the branch portions 22 corresponds to the third conductor. The same applies to a case where one of the branch portions 32 of the negative busbar 30 is welded to the negative electrode terminal 7.

The techniques disclosed in the specification are not limited to the welding apparatus that welds the terminal and the busbar in the laminated unit 9 shown in FIG. 1 and FIG. 2.

The laser irradiation apparatus may swing or move the laser oscillator. Alternatively, the laser irradiation apparatus may change a point of irradiation by moving an irradiation target (the power converter 2 including the busbars in the case of the example). For example, the laser irradiation apparatus may change a point of irradiation of the laser by fixing the laser oscillator, fixing the irradiation target to a movable stage, and moving the stage.

Specific examples of the invention have been described in detail. However, they are just examples and do not limit the claims. The techniques described in the claims include various deformations and changes added to the specific examples described above. Each of the technical elements described in the specification and the drawings achieves technical usefulness alone or as various combinations, and is not limited to the combination described in the claims at the time of application. Further, the techniques described in this specification and the drawings as examples achieve a plurality of objectives simultaneously, and have technical usefulness by achieving one of those objectives.

What is claimed is:

1. A welding apparatus that welds a third conductor to a first conductor, the third conductor being adjacent to the first conductor and being between the first conductor and a second conductor that extend in parallel to each other, the welding apparatus comprising:
   a clamp that has a first gripper and a second gripper, and is configured to sandwich the first conductor and the third conductor between the first gripper and the second gripper; and
   a welding laser configured to emit a welding laser beam towards the third conductor in a diagonal direction with respect to an array direction of the first conductor, the second conductor, and the third conductor, wherein:
   the welding laser is able to change a point of irradiation of the welding laser beam such that the point of irradiation moves within a given range of the third conductor;
   the first gripper includes a contact surface and a confronting portion that faces the contact surface, the contact surface coming into contact with the first conductor; and
   in a state where the clamp sandwiches the first conductor and the third conductor, the confronting portion is positioned between the second conductor and the third conductor, and the confronting portion and the second gripper are positioned so as to block a reflection laser beam of the welding laser beam reflected in the given range.

2. The welding apparatus according to claim 1, wherein a distance between a first surface of the confronting portion and the contact surface is equal to a distance between the first conductor and the second conductor, the first surface of the confronting portion being on an opposite side of the confronting portion from a side that faces the contact surface.

3. The welding apparatus according to claim 1, wherein a part of a second surface of the confronting portion on a side close to the contact surface, the second surface of the confronting portion facing an optical path of the welding laser beam, is parallel to the optical path of the welding laser beam.

4. The welding apparatus according to claim 1, wherein the given range is a welding range in which the third conductor is welded to the first conductor.

5. The welding apparatus according to claim 1, wherein the welding laser comprises a laser oscillator, a beam expander, an X-axis rotating galvanometer mirror a Y-axis rotating galvanometer mirror and a lens, and wherein the laser beam emitted by the laser oscillator passes through the beam expander and is reflected by the X-axis and the Y-axis rotating galvanometer mirrors, and then focused by the lens.

6. The welding apparatus according to claim 5, wherein the X-axis rotating galvanometer mirror and the Y-axis rotating galvanometer mirror are configured to rotate about respective axis that are orthogonal to each other.

* * * * *